United States Patent Office 3,052,526
Patented Sept. 4, 1962

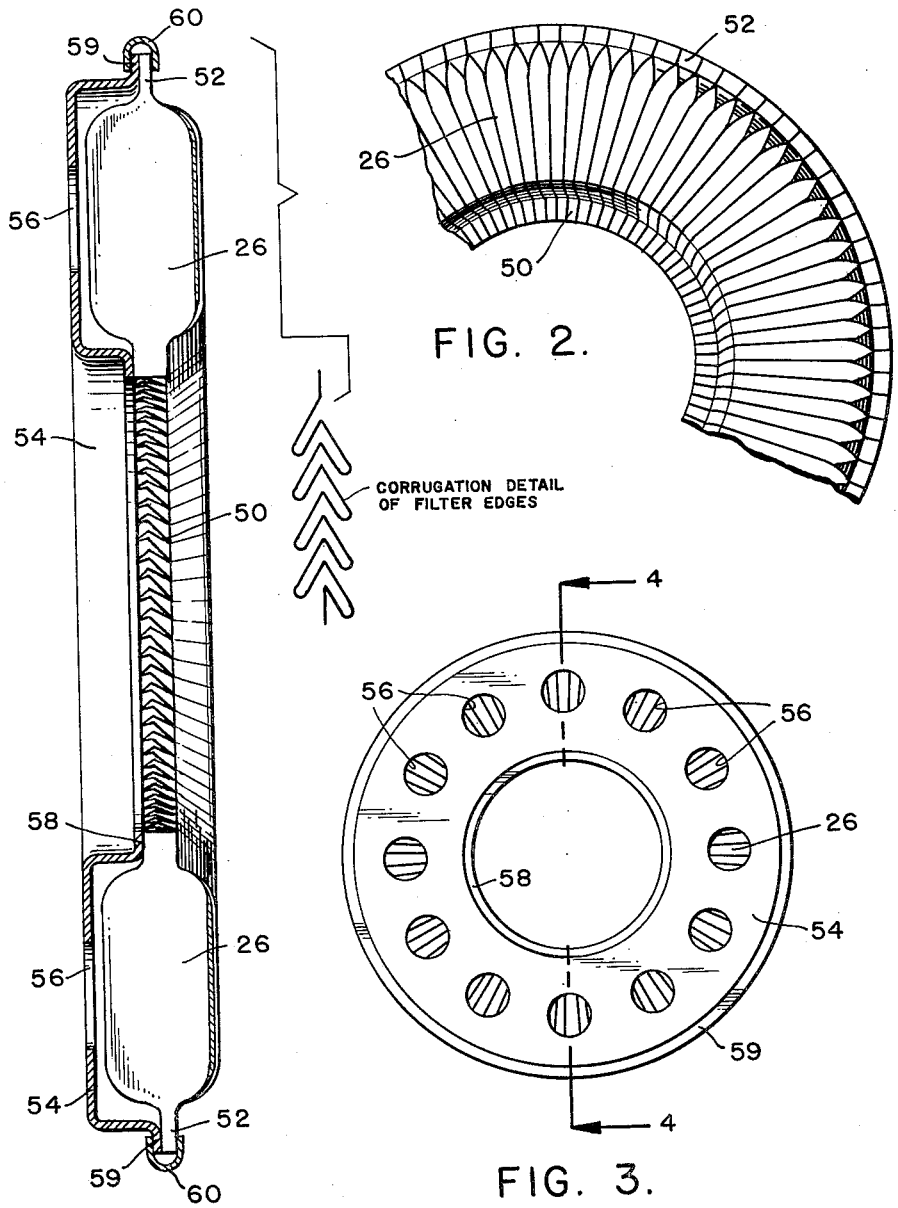

3,052,526
GAS GENERATOR
Harold G. Cook and John P. Nicholson, China Lake, Calif., assignors to the United States of America as represented by the Secretary of the Navy
Filed Mar. 5, 1959, Ser. No. 797,823
7 Claims. (Cl. 23—281)
(Granted under Title 35, U.S. Code (1952), sec. 266)

The invention described herein may be manufactured and used by or for the Government of the United States of America for governmental purposes without the payment of any royalties thereon or therefor.

The present invention relates to gas generators and more particularly to a gas generator in which solid products of combustion and foreign material produced therein, from igniter and grain charges, are filtered from the combustion gas before any gas flows from the gas generator to any part of the system in which it is to be used.

Previously, solid products of combustion would be filtered out sometime after the gas had flowed from the gas generator. This had the disadvantage of subjecting the metering orifice and regulating valves and the like to plugging due to solid products of combustion and foreign materials in the gas stream. The gas generator of this invention has a filter element made of corrugated fine woven mesh within a support cover and mounted about an igniter charge at the exhaust end of the gas generator. The filter element is ring-shaped, withstands temperatures from 2600° F. to 4600° F., and contains from 200,000 to 300,000 holes per square inch, each hole having a nominal size of about 15 microns.

An object of the invention, therefore, is to provide a new and improved gas generator in which the undersirable foreign materials and solid products of combustion from the gas producing charges therein are filtered from the gas produced before it leaves the gas generator.

Another object of the invention is to provide a new and improved gas generator having an improved microporous filter therein which will withstand temperatures up to 4600° F.

A further object of the invention is to provide a new and improved gas generator having a high heat withstanding filter therein which has from 200,000 to 300,000 holes per square inch of approximately 15 microns diameter each.

A still further object of the invention is to provide a new and improved gas generator for producing a clean high pressure gas.

Other objects and many of the attendant advantages of this invention will be readily appreciated as the same become better understood by reference to the following detailed description when considered in connection with the accompanying drawings wherein:

FIG. 2 is a fragmentary plan view of the corrugated ring-shaped gas generator filter;

FIG. 3 is a plan view on a smaller scale of the filter of FIG. 2 with a cover positioned thereon; and FIG. 4 is a cross-sectional view along line 4—4 of FIG. 3 on a larger scale and also shows an expanded view of the crimping detail of the inside and outside diameters of the filter of FIG. 2.

Referring now to the drawings, like numerals refer to like parts in each of the figures.

Figure 1:
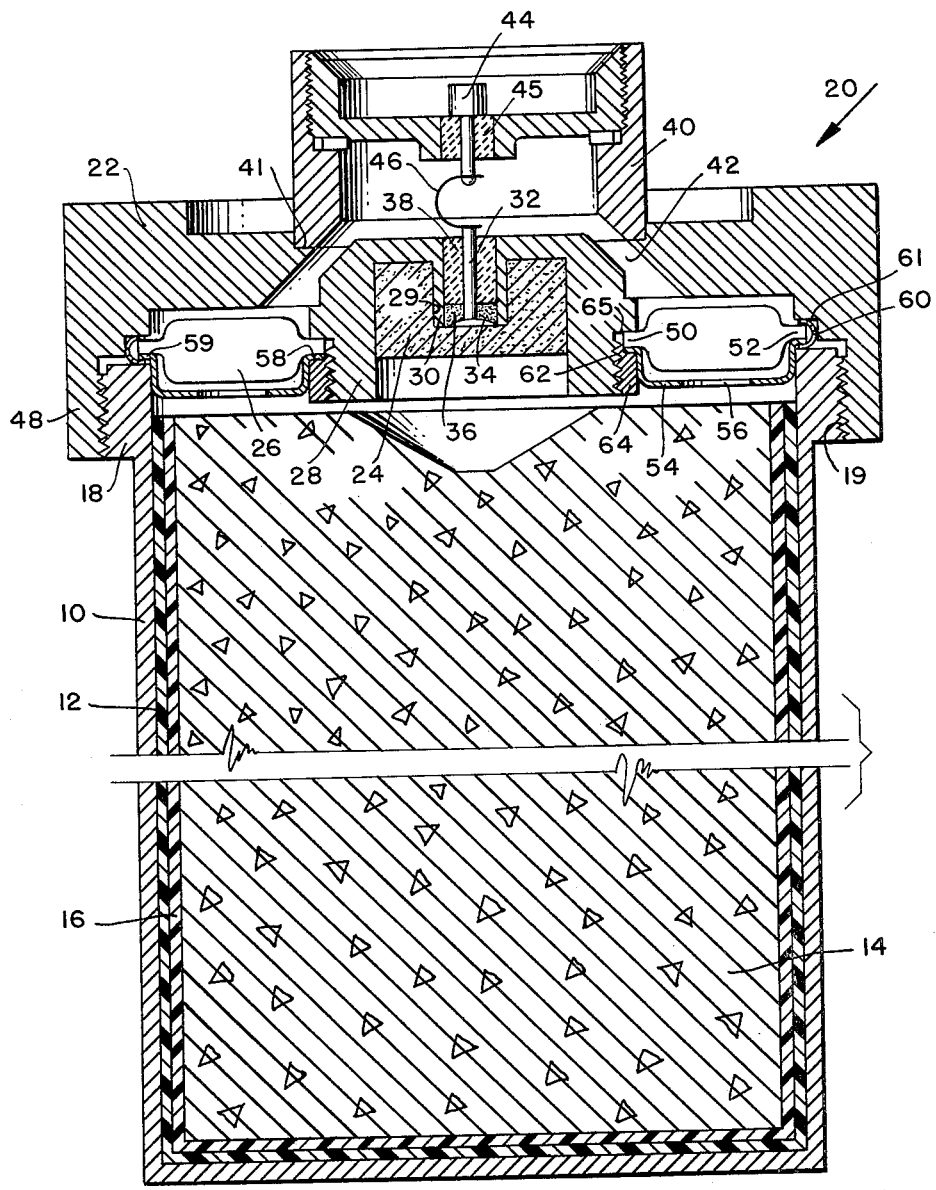
FIG. 1 is a longitudinal cross-sectional view of a preferred embodiment of a gas generator of the present invention.

The gas generator assembly shown in cross-section in FIG. 1 comprises a cylindrical canister 10 with a liner 12 therein. A gas producing grain 14 having an inhibitor coating 16 thereon substantially fills the entire canister 10. The cylindrical wall of canister 10 is of increased thickness at the open end 18 thereof and may be threaded as at 19 for fastening the canister to header assembly 20.

Header assembly 20 comprises a closure portion 22 for closing the open end of canister 10 and contains igniter grain 24 and gas filter 26. Igniter grain 24 is a cup-shaped pellet which fits within a cylindrical flange portion 28 and is recessed as at 29 from the open edge thereof. The cupped portion 29 of igniter grain 24 fits over a small hollow cylindrical portion 30 containing an electrical lead 32, heating element 34, and a small portion of easily ignitable black powder 36, for example. Electrical lead 32 is sealed within small cylindrical portion 30 and insulated from closure portion 22 by means of a ceramic insulating material 38. A blow-off portion 40 seats in groove 41 in closure portion 22 and seals passageway 42 through which gas flows from the gas generator after gas producing grain 14 is ignited and blow-off portion 40 is forced out of groove 41. Blow-off portion 40 has therein an electrical terminal 44, electrically insulated therefrom by means of a ceramic sealing and insulating material 45, and has an electrical contact spring 46 attached to terminal 44 which makes electrical contact between terminal 44 and lead 32 which, in turn, contacts heating element 34. Heating element 34 is connected between lead 32 and portion 30 which is electrically conductive, and the electrical circuit for passing a current through heating element 34, for igniting the igniter, may be completed through terminal 44, contact spring 46, lead 32, heating element 34, portion 30 and through the remainder of the header assembly 20 which may be electrically grounded. Flange 48 on header closure portion 22 is internally screw threaded at 19 to correspond to the screw threads at 19 on portion 18 of the canister, as a means for fastening header assembly 20 to canister 10, for example.

Filter 26, in header assembly 20, is shown more in detail in FIGS. 2 and 4. The filter is made up of a strip of closely woven fine metal wires forming a poromesh material for filtering solid products of combustion from hot gases, as described in Patent No. 2,973,833 issued March 7, 1961, to H. G. Cook et al. The materials used for weaving the mesh must be able to withstand very high temperatures. Stainless steel, titanium or molybdenum are suitable materials since a filter of stainless steel made in accordance with the present invention will withstand temperatures up to 2600° F., a filter of titanium will withstand up to 3200° F., and a filter of molybdenum will withstand temperatures up to 4600° F. The mesh should have a porosity of about 200,000 to 300,000 holes per square inch with the hole size being from 5 to 25 microns in diameter, the size of the majority of the holes being 15 microns. The woven poromesh material may be sintered, if desired, to secure the fine wires together, thus providing better strength and filtering characteristics. The strip of poromesh material is corrugated or crimped, the ends of the corrugated strip being fastened together and formed into a flat ring-shaped filter, as illustrated in FIGS. 2 and 4 with the corrugations extending radially outward from the center of the ring. The inner and outer edges of filter 26 are folded as shown in the corrugation detail of filter edges of FIG. 4 and are swaged flat to form peripheral ridges 50 and 52, respectively. The corrugations in the filter provide greater surface area for filtering out undesirable by-products of combustion from gases passing therethrough. It is to be noted that in forming the corrugations the strip of poromesh material is folded or crimped and that when the strip is shaped into a substantially flat ring an annulus is formed in which the corrugations extend radially; see FIG. 2. It is also to be noted that the corrugations flare outwardly, i.e. the troughs and crests of the corrugations are further apart at the outer periphery of the filter than at the inner periphery thereof and, thus, the filter has a greater filter surface area per unit facial area of the filter at the inner periphery than at outer periphery of the filter. Further to be noted is that prior to the formation of the peripheral ridges 50 and 52, the edges of the corrugated strip are resilient and that swaging them flat results in dense portions at the edges of the filter.

An annular channel member 54 having a plurality of holes 56 therethrough fits about the side of filter 26 which faces the gas producing grain 14 and is spaced a short distance therefrom. Holes 56 are shown as located adjacent the filter 26 and about midway between peripheral ridges 50 and 52. However, it will be appreciated that various arrangements and sizes of holes 56 may be used as desired. Channel member 54 has radially inwardly extending and radially outwardly extending peripheral flanges 58 and 59, respectively, which correspond and lie adjacent to ridges 50 and 52 of filter 26. A crimp ring 60 may be used over ridge 52 and flange 59 to hold filter 26 and member 54 together about their outer periphery. A similar crimp ring may also be used about the inner periphery if desired. Flange 59 of channel member 54 and peripheral ridge 52 of filter 26 are positioned between the increased thickness at the open end 18 of canister 10 and step 61 formed within closure portion 22 of the header assembly, as shown in FIG. 1. Ridge 50 of the filter and flange 58 of channel member 54 fit about the outside of cylindrical flange portion 28 which contains igniter pellet 24. The outer wall of cylindrical flange portion 28 is threaded at 62 and a retaining ring 64 may be screwed thereon, against flange 58 and ridge 50 for retaining the filter and channel member against rim 65 on portion 28 of the header assembly 20. When entire header assembly 20 is mounted on the open end of canister 10 thickened edge portion 18 of the canister wall bears against crimp ring 60 and thus against the outer peripheral flange 59 of channel member 54 and the swaged ridge 52 of filter 26 to retain the filter and channel member against step 61 of closure portion 22 and portion 28 is supported centrally of the header assembly between blow-off portion 40 and the grain 14, as shown in FIG. 1.

When gas producing grain 14 is ignited by means of igniter 24 the gas produced flows through holes 56 in channel member 54 and then through the filter 26, where the carbon, lead, dirt and other solid by-products of combustion are collected. After filtering, the clean gas passes into passageway 42 and forces blow-off portions 40 out of groove 41 permitting the gas to flow through the various portions of the system in which it is to be used. The present gas generator has the advantage of permitting longer operation of values and the like, without malfunction due to the buildup of dirt from hot gases throughout a system using such hot gases. The present gas generator also permits the use of gas producing propellants with desirable pressure and temperature characteristics that would otherwise be unusable because of dirty burn characteristics.

Obviously, many modifications and variations of the present invention are possible in the light of the above teachings. It is therefore to be understood that within the scope of the appended claims the invention may be practiced otherwise than as specifically described.

What is claimed is:

1. A high temperature gas generator system comprising a container having an open end and containing a combustible gas producing grain, a header connected to and closing the open end of said container, said header having an outlet opening and a blow-off closure seated in said opening, a cylindrical structure supported centrally within said header, said header and container formed with inner surfaces which with said structure define an annular passage about the latter, a passageway between said structure and said header, said passageway being in communication with said annular passage and said outlet opening, said annular passage being in communication with the open end of said container, an annular filter supported in said annular passage and extending thereacross, said filter comprising a corrugated strip of high temperature poromesh material formed into a substantially flat annulus with the corrugations thereof flaring outwardly from the inner periphery of the filter, whereby the filter has a greater filter surface area per unit facial area of the filter at the inner periphery of the filter than at the outer periphery thereof, and igniter means carried by said cylindrical structure and said blow-off closure for igniting said grain; whereby combustion of said grain produces a gas which is filtered by said filter and builds up to a pressure which blows off said closure and filtered gas at substantially high pressure passes through said outlet opening.

2. The system of claim 1, further comprising an annular member disposed in and extending across said annular passage between said filter and said grain, said member connected to and supporting said cylindrical structure, and said member having a plurality of spaced perforations therein through which hot gas passes to the filter.

3. The system of claim 1, wherein said poromesh material comprises fine metal wires closely woven into a mesh having a porosity of about 200,000 to 300,000 holes per square inch.

4. The system of claim 1, wherein the inner and outer peripheral edges of said filter are swaged, means on said cylindrical structure gripping the inner peripheral swaged edge, and means on said container and header gripping the outer peripheral swaged edge.

5. A high temperature gas generator comprising a container and a cover therefor; said container having an open end and containing a combustible gas producing grain, a threaded ring formed at said open end of the container; said cover having a central outlet opening and formed with a threaded skirt portion engaging said threaded ring for connecting said cover to said container; a blow-off closure in said outlet opening; a cylindrical structure within said cover aligned with said outlet opening, said structure with said ring and skirt portion defining an annular space; a passageway formed between said structure and said cover and communicating between said annular space and said outlet opening; an annular filter disposed in said annular space, said filter comprising a strip of crimped high temperature poromesh material formed into a substantially flat annulus with the crimps thereof extending radially, the inner and outer peripheral edges of said annulus being swaged flat; means on said structure securing said inner peripheral swaged edge of said filter thereto in gas tight engagement; said outer peripheral swaged edge of said filter gripped between said ring and skirt portion and held thereto in gas tight engagement; and an igniter supported by said cylindrical structure for igniting said grain.

6. The gas generator of claim 5, wherein said poromesh material comprises fine metal wires closely woven into a mesh having a porosity of about 200,000 to 300,000 holes per square inch with a hole size from about 5 to 25 microns.

7. A gas generator as in claim 5, further comprising a perforated annular channel member disposed in said annular space between said filter and said grain, said annular channel member secured at the inner periphery thereof to said cylindrical structrue, said annular channel member at its outer periphery being contiguous to said outer peripheral swaged edge of said filter and gripped between the same and said ring.

References Cited in the file of this patent

UNITED STATES PATENTS

| | | |
|---|---|---|
| 1,160,524 | Much | Nov. 16, 1915 |
| 1,781,254 | Stelzner | Nov. 11, 1930 |
| 1,941,450 | Sylvan | Jan. 2, 1934 |
| 2,537,992 | Gross et al. | Jan. 16, 1951 |
| 2,558,756 | Jackson et al. | July 3, 1951 |

FOREIGN PATENTS

| | | |
|---|---|---|
| 183,336 | Switzerland | July 5, 1935 |